United States Patent [19]

Godlewski

[11] 4,024,088

[45] May 17, 1977

[54] COMPOSITIONS AND METHODS USEFUL IN FORMING POLYETHER POLYURETHANES HAVING RELEASE PROPERTIES

[75] Inventor: Robert E. Godlewski, Mahopac, N.Y.

[73] Assignee: Union Carbide Corporation, New York, N.Y.

[22] Filed: Dec. 23, 1974

[21] Appl. No.: 536,956

[52] U.S. Cl. .............................. 260/2.5 A; 252/182; 260/2.5 AG; 260/2.5 AK; 260/77.5 R; 264/300

[51] Int. Cl.[2] ................. C08G 18/30; C08G 18/14; B29C 1/04

[58] Field of Search ... 260/2.5 AG, 260 A, 260 AK, 260/77.5 R; 252/182; 264/300

[56] References Cited

UNITED STATES PATENTS

| | | | |
|---|---|---|---|
| 2,611,744 | 9/1952 | Kipp | 252/49.6 |
| 2,796,363 | 6/1957 | Lalone | 117/167 |
| 3,007,883 | 11/1961 | Schmidt et al. | 260/2.5 AG |
| 3,038,816 | 6/1962 | Drell et al. | 106/287 |
| 3,060,030 | 10/1962 | Obenauf et al. | 99/15 |
| 3,178,490 | 4/1965 | Petrino et al. | 264/41 |
| 3,247,134 | 4/1966 | Hwa et al. | 260/2.5 |
| 3,314,814 | 4/1967 | Newman | 117/36.1 |
| 3,344,112 | 9/1967 | Birum et al. | 260/45.7 |
| 3,379,656 | 4/1968 | Eichhorn | 260/2.5 |
| 3,413,390 | 11/1968 | Heiss | 264/54 |
| 3,429,837 | 2/1969 | Langrish et al. | 260/2.5 |
| 3,476,933 | 11/1969 | Mendelsohn | 260/2.5 AC |
| 3,576,783 | 4/1971 | Kerst | 260/45.8 |
| 3,607,397 | 9/1971 | Watters | 134/3 |
| 3,624,190 | 11/1971 | Cekoda | 264/41 |
| 3,640,769 | 2/1972 | Watters | 134/42 |
| 3,649,541 | 3/1972 | Ingersoll | 252/62.54 |
| 3,661,605 | 5/1972 | Rubin et al. | 106/244 |
| 3,664,975 | 5/1972 | Kerst | 260/2.5 AJ |
| 3,694,530 | 9/1972 | Wolfe | 264/48 |
| 3,706,821 | 12/1972 | Anderson et al. | 260/951 |
| 3,725,105 | 4/1973 | Chase | 117/2 R |
| 3,726,952 | 4/1973 | Boden et al. | 264/48 |
| R24,514 | 8/1958 | Hoppe et al. | 260/2.5 BC |

FOREIGN PATENTS OR APPLICATIONS

| | | |
|---|---|---|
| 1,056,360 | 1/1967 | United Kingdom |
| 1,158,544 | 7/1969 | United Kingdom |

Primary Examiner—H.S. Cockeram
Attorney, Agent, or Firm—Eugene C. Trautlein

[57] ABSTRACT

A typical phosphatide is lecithin. This invention relates to compositions and methods for forming polyether polyurethanes utilizing organophosphorus compounds selected from the class consisting of phosphatides and compounds of the formulas:

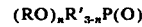

$$(RO)_n R'_{3-n} P(O)$$

and

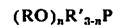

$$(RO)_n R'_{3-n} P$$

wherein R is a monovalent hydrocarbon group of at least 8 carbon atoms, R' is selected from the class consisting of hydrogen, hydroxyl and monovalent hydrocarbon groups, and n is an integer of 1 to 3, to impart the property of self-release from metal substrates, e.g., the walls of mold cavities in which they are formed and molded.

21 Claims, No Drawings

COMPOSITIONS AND METHODS USEFUL IN FORMING POLYETHER POLYURETHANES HAVING RELEASE PROPERTIES

BACKGROUND OF THE INVENTION

1. Field of the Invention

Polyether polyurethane moldings are being increasingly used in the manufacture of automobiles and furniture and in home construction. Molded polyether polyurethane foams are especially important because they are lightweight and are resistant to moisture, weather, temperature extremes, and aging. As an illustration, molded, foamed polyether polyurethane elastomers have become of special interest in the manufacture of force-reducing impact media such as safety impact bumpers for automotive vehicles and impact resistant automotive fascia.

The high demand for molded polyether polyurethane articles requires that they be produced in the largest numbers in the shortest possible time. Polyurethane-forming mixtures are eminently suited for mass production because the reactants are liquid, that is they are pumpable, and are quick-reacting. The problem has existed, however, in providing adequate mold release in the shortest possible time to take fullest advantage of the unique capabilities of the polyurethane systems.

As an illustration, it has been proposed to manufacture automotive bumpers and fascia by pumping a polyether polyol and isocyanate prepolymer through a Krauss-Maffei mixing head where intimate mixing of the polyurethane components will occur in a matter of seconds. The mixed, uncured mixture will then proceed, under high pressure, to a mold cavity where the mixture will cure to a solid or microcellular elastomer. The cured polyurethane will be removed in short order to provide a clean mold capable of accepting additional mixture. Cycle times being discussed (from initial filling of the mold to ejection of the cured polyurethane) are in the order of two to three minutes. To achieve these production cycle times, the utilization of an internal release agent in the urethane ingredients is essential.

The field of this invention relates to the quick release of polyurethane compositions from molds in which they are formed and shaped.

2. Description of the Prior Art

Heretofore, release of molded articles from molds in which they have been formed has been achieved by coating the surface of the mold cavity with an agent which facilitates release of the molded article from the walls of the mold cavity. Procedures such as this are described in U.S. Pat. Nos. 3,694,530, 3,640,769, 3,624,190, 3,607,397 and 3,413,390. This procedure has severe drawbacks. The agent, after molding, adheres either to the walls of the mold cavity or to the surface of the molded article or, in the usual case, to both. After multiple moldings and application of release agent, the agent tends to build up on the surface of the mold cavity walls and eventually covers and obscures any detail on the mold cavity surface desired to be imparted to the molded article. Also, the presence of release agent adhering to the surface of the molded article can impede subsequent operations on the article, such as painting or adhering operations. While it is possible to clean the surfaces of molded articles in preparation for painting or adhering operations, this adds to the time and expense of production. Additionally, the need to reapply the release agent after each molding or a limited number of moldings interrupts the molding operation and slows down output.

As an illustration, current practice in molding urethanes is to apply an externally applied substance to the mold cavity. The externally applied release agents are applied by spray or wipe-on techniques. Generally, the release agent adheres to the surface of the molded urethane, thus removing the deposit applied to the mold surface. This presents problems in that additional release agent has to be applied to the mold, and the surface of the urethane has to be degreased in order for paint to adhere to the urethane. Cycle times are long for such a process, which adds to the cost of manufacture of each urethane part.

U.S. Pat. No. 3,726,952 describes the use of additives for polyurethane foam forming mixtures for the purpose of imparting mold release properties. The additives described contain at least 25 carbon atoms and are salts of an aliphatic carboxylic acid and either a primary amine or an amine containing amide or ester groups. While these additives may provide the release property to some extent, they have not been found to sufficiently reduce the forces necessary to release the molding from the mold quickly.

U.S. Pat. No. 3,725,105 describes the addition of silicones to epoxy coating compositions to impart a release surface to the coating after curing and thus prevent the adhesion of dirt and other foreign material thereto.

Lecithin has been employed for a variety of purposes. U.S. Pat. No. 3,314,814 discloses the use of lecithin as a bodying agent in coating compositions used in the manufacture of transfer papers. U.S. Pat. No. 3,649,541 describes the use of lecithin as a dispersing agent for ferromagnetic chromium oxide in coating compositions used to make magnetic tapes.

Lecithin has also found considerable use in the food industry. U.S. Pat. No. 3,060,030 describes its use as an emulsifier in baking mixes (cake mixes) where it prevents dipping or falling in the center of the cake and provides easy release from the pan after baking. Lecithin is also used as a dispersion in water with a propellant in an aerosol container for spraying onto cooking utensils to prevent the sticking of food during heating. This use is described in U.S. Pat. Nos. 3,661,605, 3,038,816 and 2,796,363.

U.S. Pat. Nos. 3,607,397 and 3,640,769 disclose the use of lecithin as an external mold release agent which is applied to the surface of the mold before charging a polyurethane-forming molding composition. They cite the fouling of the mold surfaces and prescribe methods for retarding such fouling or rejuvenating fouled surfaces. No instances have been found where lecithin has been used in polyurethane-forming molding compositions to impart self-release characteristics to such compositions.

Phosphorus compounds have been used as additives in polyester polyurethanes to prevent scorching or impart fire resistance. Examples of such uses are U.S. Pat. No. 3,429,837 and British Pat. No. 1,056,360. No prior art has been found, however, which teaches the use of lecithin or the phosphorus compounds specified herein to impart self-release properties to polyether polyurethanes.

SUMMARY OF THE INVENTION

The present invention is based in part on the discovery that phosphatides, such as lecithin, or fatty alcohol esters of phosphorus acids, when added to polyether polyurethane-forming compositions adapted to produce cured articles in contact with metal substrates, for example, in a mold cavity, permit the release of such molded articles from the substrate using a minimal amount of release force. The cured polyurethane can be easily removed from the substrate, thus eliminating the need for the use of a release agent applied to the substrate. Accordingly, the invention relates to compositions and methods for manufacturing polyurethanes by utilizing an organic polyisocyanate and an organic compound having at least two active hydrogen atoms per molecule reactive with the polyisocyanate to form the polyurethane and an organophosphorus compound as an internal release agent mixed with the organic compound or the polyisocyanate or both. The invention, furthermore, relates to the production of cellular polyurethanes and polyurethane elastomers such as those used in the manufacture of energy absorbing automotive bumpers and fascia.

As will be apparent to those skilled in the art, while the present invention is described herein with particular reference to cellular polyether polyurethane elastomers, the invention is applicable to the other types of polyether polyurethane plastics including the rigid and flexible types and those in between.

DESCRIPTION OF THE PREFERRED EMBODIMENTS

The organophosphorus compounds used as internal release agents in molded polyether polyurethanes according to this invention include the phosphatides or phospholipides and organophosphorus compounds of the formulas:

$$(RO)_n R'_{3-n} P(O)$$

and $$(RO)_n R'_{3-n} P$$

wherein R is a monovalent hydrocarbon group of at least 8 carbon atoms, preferably 9 to 18 carbon atoms, R' is selected from the class consisting of hydrogen, hydroxyl and monovalent hydrocarbon groups, preferably having 1 to 18 carbon atoms, and $n$ is an integer of 1 to 3. The phosphatides include lecithin, (phosphatidyl choline), phosphatidyl inositol, phosphatidyl ethanolamine, phosphatidic acid, phosphatidyl serine, phosphatidyl glycerol, diphosphoinositide and the like.

Lecithin is described (Kirk Othmer, Encyclopedia of Chemical Technology, Second Edition, pages 343–361) as a phosphorus-containing lipid, that is, a phosphatide (phospholipid), found in all living organisms, both plant and animal. It consists of glycerol combined with two fatty acid radicals, phosphoric acid, and choline (q.v.); hence, there may be many lecithins or phosphatidyl cholines (choline esters of phosphatidic acids) (I) and (II), depending on the nature and disposition of the fatty acid groups. These choline esters are usually represented, as in formulas (III) and (IV), although the internally neutralized zwitterion structure (V) is considered the most probable. In commercial practice, however, the term "lecithin" refers to a mixture of acetone-insoluble phosphatides, including "true lecithin" (phosphatidylcholines) and cephalin, together with other substances such as carbohydrates, glyceride oils, and sterols that occur with the phosphatides.

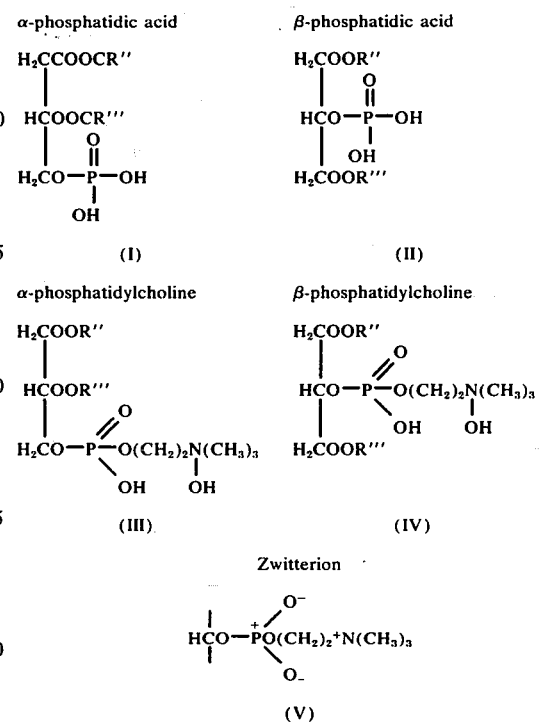

R" and R''' in formulas I–V designate monovalent hydrocarbon groups derived from fatty acids.

Lecithin, as well as other naturally derived phosphatides, usually contain residual organic acid which can interfere with the cure rate of the polyurethane. This interference can be related to the reaction of the residual organic acid and the catalyst, e.g., dibutyl tin dilaurate (DBTD), commonly used in the polyurethane-forming reaction mixture employed. However, this interference can be eliminated by the addition of more catalyst, e.g., DBTD, or by the addition of an amine accelerator like Dabco 33LV (33 weight % triethylene diamine in dipropylene glycol). It is also recognized that neutralization of the residual organic acid in the lecithin can be accomplished by the utilization of other neutralizers. In addition, it is possible for lecithin to be prepared with a negligible amount of organic acid, but this would be more costly. The following acid numbers were measured on samples of commercial grades of lecithin employed in the invention, and it can be recognized that they are relatively constant for these commercial grades.

| Grade | Manufacturer | Acid Number mgKOH/g.sample |
|---|---|---|
| Alcolec 439-C | American Lecithin Co. | 26 |
| Alcolec 329 | American Lecithin Co. | 22.1 |
| Lecithin No. 1 | Cosan Chemical Corp. | 29.3 |
| Lecithin WD | Cosan Chemical Corp. | 25.5 |
| Lecithin LV | Cosan Chemical Corp. | 27.7 |

Organophosphorus compounds of the formula $(RO)_n R'_{3-n} P(O)$ include hydrogen-O,O-dilauryl phosphonate, $(C_{12}H_{25}O)_2 HP(O)$; trilauryl phosphate, $(C_{12}H_{25}O)_3 P(O)$; n-butyl-O,O-distearyl phosphonate, $(C_{18}H_{37}O)_2C_4H_9P(O)$; diethyl-O-palmityl phosphinate, $(C_{16}H_{33}O)(C_2H_5)_2P(O)$; distearyl-O-capryl phosphinate, $(C_{10}H_{21}O)(C_{18}H_{37})_2P(O)$; trimyristyl phosphate, $(C_{14}H_{29}O)_3P(O)$; hydrogen-O,O-dilauryl phosphate, $(C_{12}H_{25}O)_2HOP(O)$, and the like.

Organophosphorus compounds of the formula $(RO)_nR'_{3-n}P$ include trilauryl phosphite, $(C_{12}H_{25}O)_3P$; hydrogen-O,O-dilauryl phosphonite, $(C_{12}H_{25}O)_2HP$; distearyl-O-capryl phosphinite, $(C_{10}H_{21}O)(C_{18}H_{37})_2P$; n-butyl-O,O-dimyristyl phosphonite, $(C_{14}H_{29}O)_2C_4H_9P$; tristearyl phosphite, $(C_{18}H_{37}O)_3P$; dioctyl-O-palmityl phosphinite, $(C_{16}H_{33}O)(C_8H_{17})_2P$ and the like.

The amount of organophosphorus compound employed in the polyurethane-forming mixture is not narrowly critical and can be varied considerably. The amount used depends largely upon the degree of release force desired. Very small amounts are effective in providing release properties. There can be used as little as 0.25 weight % based on the total weight of the polyurethane system including the polyisocyanate, the active hydrogen compound or compounds, the catalyst, the blowing agent (if used) and any other active ingredients used. Higher amounts up to 10 weight % on the same weight basis can be used. A preferred range is 0.5 to 1 weight % on the weight basis given above.

The organophosphorus compound can be premixed with the polyisocyanate or with the active hydrogen compound or compounds or it can be added separately to the reaction mixture. It is customary practice to premix the catalyst and blowing agent (if used) and other ingredients except the polyisocyanate with the active hydrogen components and to package and sell and ship such premixtures to the polyurethane molder. It is therefore preferred to premix the organophosphorus release agents with the active hydrogen component.

This invention is useful in any of the systems for making solid or cellular polyurethanes known to those skilled in the art. It is of particular importance in making solid or cellular polyether polyurethane elastomers by forming a reaction mixture containing:

a. a polymer polyol comprising a major amount of a normally liquid polyoxyalkylene polyol that has a molecular weight of at least 1500 and a hydroxyl number from 20 to 120 and that contains therein a minor amount of a film forming organic polymer having a molecular weight of at least 5000, b. if it is desired to form a polyurethane-polyurea elastomer, an aromatic polyamine having at least two primary amine groups attached to carbon atoms of the same or different aromatic rings, at least one of such carbon atoms being adjacent to a carbon atom having a substitutent other than hydrogen, c. an organic polyisocyanate in an amount that provides from 0.8 to 1.3 (preferably from 0.95 to 1.1) isocyanato groups per active-hydrogen group in the reaction mixture, d. a catalytic amount of catalyst or catalysts for curing of the reaction mixture to produce the elastomer and, e. if desired to produce a cellular product, a blowing agent in an amount sufficient to produce a cellular structure in the elastomer, said reaction mixture containing from 100 to 65 (preferably from 97 to 85) parts by weight of (a) and from 0 to 35 (preferably from 3 to 15) parts by weight of (b) per 100 parts by weight of (a) and (b). The reaction mixture is then cured to produce the elastomer.

In a preferred embodiment, the reaction mixture employed in this invention also contains:

f. an aromatic glycol and the reaction mixture contains from 1 to 35 (preferably from 1 to 20) parts by weight of (f) per 100 parts by weight of (a) and (f) with the proviso that the reaction mixture contains no more than 35 parts by weight of (b) + (f) per 100 parts by weight of (a), (b) and (f).

As will be apparent to those skilled in the art, a specific formulation or reaction mixture for an elastomer cannot be described which would answer each and every application requirement. This would depend upon the specifications necessary for satisfactory performance under the given conditions. The skilled worker, therefore, is able to select the formulation that best satisfies the particular application requirement and may add the organophosphorus release agent according to this invention. For example, as will be apparent to those skilled in the art, a specific formulation (reaction mixture) for an energy absorbing impact elastomer cannot be described which would answer each and every application requirement. The reaction mixture used in a particular case will depend upon the specifications necessary for satisfactory performance under the given conditions. For example, the particular operating temperature range, the final forces and deflections allowed during the impact cycle, cost requirements, processing requirements, etc., must be considered for each case.

The polymer polyols employed in the preferred embodiment of this invention have a normally liquid polyol component that has a molecular weight of at least 1500 (preferably from 2000 to 8400) and that has a hydroxyl number from 20 to 120 (preferably from 25 to 50 when microcellular elastomers are being produced). The polymer polyol also has a polymer component that has a molecular weight of at least 5000. The polymer component is dissolved or dispersed in the polyol component. The polymer polyol preferably contains from 85 to 60 parts by weight of the polyol and from 15 to 40 parts by weight of the polymer per 100 parts by weight of the polymer polyol. In the process of this invention, these polymer polyols react with the organic polyisocyanate to produce urethane groups. Polyols of the polymer polyol type are used in the formulations of this invention because they impart higher modulus to the elastomer than conventional polyols. Further, the polymer polyols are desired because of the modulus insensitivity to temperature of the elastomer produced therefrom. Illustrative of useful polymer polyols are NIAX Polyols 31-28, 34-28, 24-32, 31-45 and 34-45. Suitable polymer polyols are disclosed in U.S. Pat. Nos. 3,304,273; 3,383,351 and 3,523,093; Belgian Pat. No. 788,115; Canadian Pat. No. 785,835 and Kuryla et al., "Polymer/Polyols, A New Class of Polyurethane Intermediates," J. Cellular Plastics, March 1966.

The polymers in the polymer polyols employed in the process of this invention include those produced from monomers such as hydrocarbon olefins (e.g., styrene, chlorostyrene), olefinic nitriles (e.g., acrylonitrile, methacrylonitrile), alkenyl esters of alkanoic acids (e.g., vinyl acetate, vinyl propionate, vinyl butyrate), alkyl acrylates (e.g., methyl acrylate and ethyl acrylate), alkyl methacrylates (e.g., methylmethacrylate and ethylmethacrylate), unsaturated aliphatic acids (e.g., acrylic acid and methacrylic acid). The preferred olefin is acrylonitrile alone or mixed with styrene. Preferably, the polymer component is formed in situ by polymerizing one or more polymerizable monomers in the polyol.

The polyol in the polymer polyol employed in the process of this invention is a polyether polyol, a polyhydroxyalkane, a polyphenol, a polyoxyalkylene polyol, or the like. Among the polyols which can be employed are one or more polyols from the following classes of compositions, alone or in admixture, known to those skilled in the polyurethane art.

a. Alkylene oxide adducts of polyhydroxyalkanes;
b. Alkylene oxide adducts of non-reducing sugars and sugar derivatives;
c. Alkylene oxide adducts of phosphorus and polyphosphorus acids;
d. Alkylene oxide adducts of polyphenols;
e. The polyols from natural oils such as castor oil, and the like.

Illustrative alkylene oxide adducts include, among others, the alkylene oxide adducts of ethylene glycol, propylene glycol, 1,3-dihydroxypropane, 1,3-dihydroxybutane, 1,4-dihydroxybutane, 1,4-, 1,5- and 1,6-dihydroxyhexane, 1,2- , 1,3-, 1,4-, 1,6- and 1,8-dihydroxyoctane, 1,10-dihydroxydecane, glycerol, 1,2,4-trihydroxybutane, 1,2,6-trihydroxyhexane, 1,1,1-trimethylolethane, 1,1,1-trimethylolpropane, pentaerythritol, caprolactone, polycaprolactone, xylitol, arabitol, sorbitol, mannitol, and the like; preferably the adducts of ethylene oxide, propylene oxide, epoxybutane, or mixtures thereof. A preferred class of alkylene oxide adducts of polyhydroxyalkanes are the ethylene oxide, propylene oxide, butylene oxide, or mixtures thereof, adducts of trihydroxyalkanes. Ethylene oxide capped ($-OC_2H_4OH$ terminated) propylene oxide polyols are preferred because of their increased reactivity over non-capped propylene oxide polyols thus leading to decreased demold times for the molded article.

Blends of polyols described above and polymer polyols described above can be used as the active hydrogen component as desired. Alternative, the polyols described above can be used without the polymer as the active hydrogen component. Broadly, the active hydrogen component of the compositions of this invention is free of polyesters of polycarboxylic acids or anhydrides.

The aromatic polyamines which can be employed when desired in this invention contain at least two primary amino groups attached to carbon atoms of the same or different aromatic rings, at least one of such carbon atoms being adjacent to a carbon atom having a substituent other than hydrogen (i.e., at least one of the primary amino groups is "hindered"). As used herein, "polyamine" denotes a monomer or polymer containing a plurality of amino groups and does not necessarily denote a polymer of a monomeric amine. In the process of this invention, these polyamines react with the organic polyisocyanate to produce urea groups and function as chain extenders. Aromatic polyamines are used as extenders in the process of this invention because they impart high load bearing ability and modulus insensitivity to temperature to the resulting elastomer. Illustrative of suitable hindered aromatic polyamines are 3-chloro-4,4'-diaminodiphenylmethane, 4,4'-methylene bis (2-chloroaniline), cumene diamine, toluene diamine, dichlorobenzidine, etc.

The organic polyisocyanates employed in this invention include monomeric and polymeric organic polyisocyanates, aliphatic and aromatic polyisocyanates and prepolymers produced by reacting a polyol with an excess of a polyisocyanate. The preferred polyisocyanates are quasi-prepolymers (especially the reaction products of excess tolylene diisocyanate and short chain polyoxypropylene diols or triols, e.g., those having 2 to 4 oxypropylene groups) because of the ease of processing such materials.

A wide variety of polyisocyanates can be used as such or as prepolymers formed by reaction with polyols as indicated above. Suitable polyisocyanates for use in the process of this invention include poly(arylene-isocyanates) having at least two aromatic rings with one isocyanato group on each ring. These aromatic rings are suitably interconnected by an ether, sulfone, sulfoxide, methylene, propylene, carbonyl linkage or by two methylene groups connected to a benzene ring substituted by an isocyanato group. The aromatic rings of the poly(arylene-isocyanate) can be substituted, e.g., by methyl, ethyl or propyl groups. Suitable poly(arylene-isocyanates) include polymethylene poly(phenyleneisocyanates) having the formula:

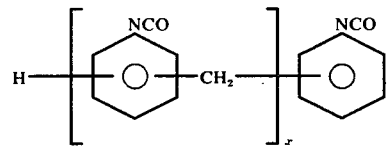

wherein $x$ has an average value from 1.1 to 5 inclusive (preferably from 2.0 to 3.0). Other suitable polyisocyanates include 4,4'diphenylmethylene diisocyanate; 3,3'-diphenylmethylene diisocyanate; diphenyl diisocyanate; diphenylsulfone diisocyanate; diphenylsulfide diisocyanate; diphenylsulfoxide diisocyanate; and diphenylpropane diisocyanate; and the isomeric tolylene and xylene diisocyanates and their residue products.

The aromatic glycols which can be employed when desired in this invention include reaction products of alkylene oxides with aromatic amines or alcohols having two active hydrogens, especially reaction products or alkylene oxides with di[hydroxyalkoxy] aryl compounds and primary amino aryl compounds. In the process of this invention, the aromatic glycols react with the organic polyisocyanates to form urethane groups and function as chain extenders. The preferred aromatic glycols are the reaction products of ethylene oxide and aniline. Others may be used such as an ethylene oxide and propylene oxide adducts of bisphenol A ("PLURACOL-P-245") or the propylene oxide adducts of aniline ("C-100").

The catalysts employed in the process of this invention accelerate the cure of the reaction mixture and include organic amines and organometallic compounds such as lead octoate, dibutyltin dilaurate, tin octoate, cobalt octoate and triethylene diamine.

The blowing agents employed in the process of this invention include any compound capable of generating an inert gas under the conditions used to cure the elastomer (e.g., by reaction to produce a gas or by volatilization). Suitable blowing agents include water and volatile halocarbons (especially chlorocarbons and chlorofluorocarbons) such as methylene chloride, trichloromonofluoromethane, dichlorofluoromethane, dichloromonofluoromethane, dichloromethane, trichloromethane, bromotrifluoromethane, chlorodifluoromethane, chloromethane, 1,1-dichloro-1,1- fluoromethane, 1,1-difluoro-1, 2,2-trichloroethane, chloropentafluoroethane, 1-chloro-1-fluoroethane, 1-chloro-2-fluoroethane, 1,1,2-trifluoroethane, 2-chloro-1,1,2,3,3,4,4-nonofluorobutane, hexafluorocyclobutane and octafluorobutane. Other useful blowing agents include low-boiling hydrocarbons such as butane, pentane, hexane, cyclohexane and the like. The amount of the blowing agent employed is determined by the desired elements of the cellular elastomer to be produced. In this connection, the elastomers produced by the process of this invention can be designed to have any of a wide range of densities, e.g., from 5 to 70 pounds per cubic foot. For certain applications, e.g., for automobile bumpers, the elastomers preferably have densities from 10 to 40 and such densities can be achieved by employing from 3 to 10 parts by weight of a blowing agent (such as methylene dichloride or trichloromonofluoromethane) per 100 parts by weight of the active hydrogen-containing components and the polyisocyanate in the reaction mixture.

In this invention, the reaction mixture can be formed and cured in accordance with the standard techniques known in the art. Thus, in those cases where molded microcellular elastomers are to be produced, the techniques described in Dunleavy, "Some Aspects of the Microcellular Urethane Material and Process," J. Elastoplastics, 2, Jan. 1970, are applicable.

This invention is particularly well suited for use in Liquid Reaction Molding (LRM) systems utilizing a liquid polyether polyol and liquid polyisocyanates. LRM systems are schematically illustrated as follows:

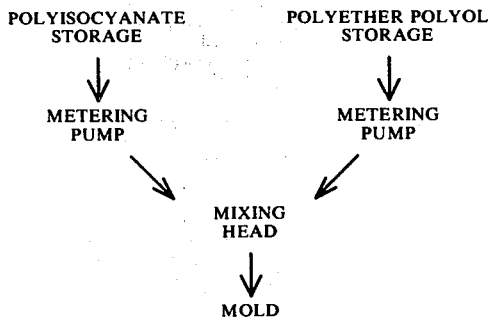

Suitable LRM systems are described in two Kunstoffe articles appearing in volume 61 for August 1971, pages 540–544 and September 1971, pages 639–645. The disclosures of both of these are incorporated herein by reference.

In the mixing head, metered amounts of polyisocyanate and polyether polyol (in appropriate relative amounts for producing the desired polyurethane) are instantly intimately mixed by impingement-of-one against the other in a mixing chamber in the mixing head. Other additives such as catalyst, blowing agent, and internal mold release agent, as well as additional active hydrogen component, are pre-mixed with the polyether polyol (or the polyisocyanate, if desired) before it is metered and pumped to the mixing head. The two liquid reactant streams are atomized and forced against each other upon entering the mixing chamber so that an intimate mixture immediately results. Impingement mixing of the type described above requires only a few seconds of time, for example, or the order of 4 to 10 seconds. The resulting mixture is then introduced into the mold while recirculating the two reactant streams back to their respective pumps. The entire cycle through the molding stage and ejection from the mold can consume only a few minutes, for example, from 1 to 4 minutes. If full utilization of the mold is desired, there is substantially no time available for cleaning the mold surfaces and treating same with an external mold release. The self-release compositions of this invention are fully suitable for use in impingement mixing LRM systems and are compatible with the requirements of such systems. Furthermore, the molded products resulting from the use of the compositions of this invention require no subsequent treatments to render them suitable for painting or other finishing operations and can be painted or otherwise finished directly upon removal from the mold. Since the polyurethane-forming and polyurea-forming reactions involved in the cure of the reaction mixtures are exothermic, curing can usually be accomplished without the application of heat from an external source in those cases where polyurea-forming components are used.

In the practice of this invention, one or more of each of the starting materials can be employed. In fact, it is often preferable to employ more than one of at least some of the staring materials, particularly the organic polyisocyanate (i.e., mixtures of isomeric tolylene diisocyanates) and catalyst (i.e., both tin and amine catalysts).

The cellular elastomers produced in accordance with preferred embodiments of this invention are useful as energy absorbing components in automobile bumpers, packaging and the like.

The molecular weights of the polyols and polymer polyols described herein are weight average molecular weights.

EXAMPLES

The following examples illustrate the present invention. All parts and percentages are on a weight basis unless otherwise specified.

| Abbreviation | Meaning |
| --- | --- |
| php | Weight parts per hundred weight parts of the composition. |
| EW (Equivalent Weight) | A unit basis for calculation of reactant weight ratios. It is the weight of a substance that theoretically combines with one gram of hydrogen or eight grams of oxygen, i.e., EW(Hydrogen = 1) and EW(Oxygen = 8). |
| Hydroxyl Number (OH No.) | A measure of the equivalent weight of a hydroxyl-containing substance. $$OH\ No. = \frac{56.1 \times 1000}{EW}$$ Expressed as milligrams of potassium hydroxide per gram of material. |
| FNCO (Free Isocyanate) | A measure of the EW of an isocyanate-containing material. $$\%\ FNCO = \frac{4.2}{EW} \times 1000$$ Expressed as the weight percent of the reactive or free isocyanate content of a substance. |
| Polyol A | A polyalkylene oxide triol produced from propylene |

| Abbreviation | Meaning |
|---|---|
| | and ethylene oxides and glycerin and having a molecular weight of about 3000 and an equivalent weight of 1000. The alkylene oxide units are present primarily in blocks and the primary OH content is about 75 mol %. The ethylene oxide is used to "cap" the triol. Based on its alkylene oxide content this triol contains 85 wt. % $C_3H_6O$ and 15 wt. % $C_2H_4O$. |
| Polyol B | A polyalkylene oxide triol produced from propylene and ethylene oxides and glycerine. The alkylene oxide units are present primarily in blocks and the primary OH content is about 73 mol %. The ethylene oxide is used to "cap" the triol. Based on its alkylene oxide content this triol contains 85 wt. % $C_3H_6O$ and 15 wt. % $C_2H_4O$. This triol has an average of 2.6 OH groups per molecule and a hydroxyl number of 34. |
| Polymer/Polyol I | A polymer/polyol having EW = 2000 and produced by polymerizing 20 wt. % acrylonitrile in 80 wt. % Polyol A. The polymer in this polymer/polyol has a molecular weight of about 6000. |
| Aromatic Diol I | Reaction product of 1 mol of aniline and 2.4 mols of ethylene oxide. $N[(CH_2CH_2O)_{1.2}H]_2$ EW~90 |
| Polyol Blend I | A mixture of 87 wt. parts of Polymer/Polyol I, 6.5 wt. parts of Aromatic Diol I, 6.5 wt. parts of ethylene glycol and 0.08 wt. parts of DBTD. The mixture contained 0.045 wt. % $H_2O$ and had a hydroxyl number of 181. |
| Polyol Blend II | Same as polyol blend I except that it contains 0.05 wt. parts DBTD instead of 0.08 wt. parts. |
| Polyol Blend III | A mixture of 89 wt. parts of Polymer/Polyol I, 5.5 wt. parts of Aromatic Diol I, 5.5 wt. parts of ethylene glycol. The mixture contained 0.0389 wt. % $H_2O$ and had a hydroxyl number of 153. |
| Polyol Blend IV | Same as polyol blend I except that it contains 0.02 wt. parts DBTD instead of 0.08 wt. parts. |
| Polyol Blend V | Same as polyol blend I except that it contains 0.6 wt. parts Dabco instead of 0.08 wt. parts DBTD |
| DABCO 33LV | 33% triethylene diamine, |

| Abbreviation | Meaning |
|---|---|
| |  in dipropylene glycol. |
| DBTD | dibutyltin dilaurate. |
| Isocyanate A | This is a quasi prepolymer containing 30.95 wt. % free NCO produced by reacting (a) an excess of a mixture containing 80 wt. % 2,4-tolylene diisocyanate and 20 wt. % 2,6-tolylene diisocyanate with (b) a polyol produced by reacting glycerin and propylene oxide and having a hydroxyl number of 633. |
| Lecithin I | Alcolec 439-C, obtained from American Lecithin Company, acid number of 27. |
| Lecithin II | Lecithin No. 1, obtained from Cosan Chemical Corporation, acid number 29.3. |
| Lecithin III | Lecithin LV, obtained from Cosan Chemical Corporation, acid number 27.7, less viscous than Lecithins I, II and IV and reported to be a cut obtained during extraction of the more viscous grades of lecithin obtained from soybean oil. |
| Lecithin IV | Lecithin WD, obtained from Cosan Chemical Corporation, acid number 25.5. |
| Lecithin V | Alcolec 329, obtained from American Lecithin Company, acid number 22.1, reported to be a purified lecithin. |
| MG-17 | "Mold Wiz", a product obtained from Axel Plastics Research Laboratories, Inc.; analyzed to be a fatty amine such as that described in U.S. Patent 3,726,952. |
| Loxiol | Loxiol VPT-1591, a product obtained from Henkel, Inc.; reported to be a complex ester of pentaerythritol graphically illustrated as: wherein the long straight lines are lauric groups, the squares are pentaerythritol residues and R represents adipic acid residues. |
| 7063 | Product 7063, octadodecyl stearate obtained from Henkel, Inc. |

TEST METHODS FOR EVALUATING RELEASE PROPERTIES

Prior to weighing and mixing of the polyurethaneforming components, aluminum loaf pans measuring 8½ inches × 4½ inches × 2½ inches were sprayed with a silicone release agent so as to coat the inside surface of each pan. The substrate upon which the urethaneforming mixture was to be poured was cleaned as described hereinafter and dried by wiping with a clean cheese cloth. The substrate measured 3 inches × 5 inches × 0.25 inch for the aluminum panels (3003 H14 obtained from Q Panel Company) and 3 inches × 5 inches 0.15 inch for the nickel plated steel (American Nickeloid Corporation). A ¾ inch Scotch brand transparent tape (MMM Co.) was then applied to one edge of the metal substrate so that the exposed area remaining on each substrate was approximately 4 inches in length and always 3 inches in width. It was determined previously that the urethane would not adhere to the non-adhesive side of the Scotch brand transparent tape, thereby providing a "lip" for testing purposes as will be described later. The metal substrate was then placed in the baking pan so that the surface desired to be in contact with the urethane faced upwardly and was not in contact with the silicone release agent applied to the baking pan. The baking pan containing the metal substrate was then placed in an oven set at 150° F.

The polyol blend was weighed in a plastic coated cup followed by additional DBTD, if necessary, and the release agent being examined. In a separate cup, the isocyanate component was weighed in excess of that needed to react with the polyol at a 105 Index. The cup of polyol blend was then placed on a balance and the balance was set to a weight corresponding to the quantity of the isocyanate component dsired to be mixed with the polyol blend. The isocyanate component was then rapidly poured into the polyol blend, followed by mixing of the ingredients. The mixed components were then poured upon the metal substrate located in an oven at 150° F. After a 3 minute waiting period, the baking pan containing the cured urethane, in intimate contact with the metal substrate, was removed from the oven. The resulting polyurethane overflowed the metal substrate in the pan. However, the silicone release agent that had previously been applied to the baking pan served to release the polyurethane with the metal substrate attached. The excess cured polyurethane was then cut off with a knife blade so that the edges of the metal substrate were exposed.

By lifting the cured polyurethane off of the Scotch brand tape that was attached to the metal substrate, a "lip" of cured polyurethane resulted. The metal substrate "lip" was that portion of the substrate that had the Scotch brand tape adhered to it. Thus, the "lips" were attached to the jaws of an Instron tester and the amount of release force needed to pull the cured polyurethane from the metal substrate was measured.

The Instron jaw separation speeds were set at 20 in/min while the chart speed was set at 10 in/min. The release forces were recorded on th traveling chart along with the distance of travel of the cured polyurethane coming off of the metal substrate. Both the minimum and maximum force values were determined and are presented in the tables given hereinbelow. Distance of travel was recorded and is related to the ease of removing the cured polyurethane from the metal substrate. For example, at relatively high release forces, the cured polyurethane released from the metal substrate over an approximate distance of 4 inches (the length of the metal adhered to the polyurethane). The distance was approximate in that, at times, when preparing the specimen for testing on the Instron, the point at which the jaws were attached varied slightly and in some cases may have been beyond the area covered by the Scotch brand tape on the metal substrate. In the case of a specimen exhibiting relatively low release values, during the stripping of the cured polyurethane from the metal, there were areas where the polyurethane released so quickly and over such a short distance of travel that it was beyond measurement by the Instron. The values recorded in this case were those where some adherence, although slight, had occurred. The procedure was used in developing release forces and travels in Examples 1 – 68 and Comparisons A - GGG.

CLEANING OF METAL SUBSTRATES

The metal substrates that the polyurethanes were poured upon had to be cleaned so that there was confidence that all oil or grease (e.g., fingerprints) had been removed. Therefore, the following cleaning procedure was employed in every case.

ALUMINUM SUBSTRATES

Cleaning Method A

The aluminum panel was first degreased by immersing in a 50/50 by volume toluene/ perchloroethylene solvent for approximately 10 minutes. The substrate was then removed and allowed to air dry at room temperature. A bath, previously, prepared by dissolving 10 KOH pellets in 500 cc of cool tap water, was employed as a final degreasing step. The substrates were placed in the KOH bath for approximately 5 minutes followed by rinsing in hot tap water. They were then wiped dry using a clean, dry cheese cloth, taking precautions to avoid fingerprints. Whereas the aluminum substrate repelled water prior to cleaning, afterwards water readily wet the surface of the substrate. The KOH treatment of aluminum is known to etch the surface of aluminum in addition to its degreasing effect. It is considered a severe cleaning treatment for aluminum.

CLeaning Method B

A relatively milder cleaning treatment for the aluminium substrates was also utilized. Ivory Soap suds were used twice to wash the panels followed each time by rinsing in warm tap water. The panels were dried with a clean, dry cheese cloth. Prior to cleaning and after cleaning in this manner, the aluminum surface continued to repel water. It was considered a milder form of cleaning.

NICKEL PLATED STEEL

The electroplated nickel steep panels were coated on one side only of the panels and were bright and smooth in appearance. The severe cleaning procedure utilized employed Ajax cleanser and water (twice) followed each time by rinsing in warm tap water followed by wiping dry with a clean, dry cheese cloth. Prior to cleaning, the bright surface repelled water whereas, after cleaning, water readily wet the surface.

EXAMPLE 1

In Table I, Comparison A refers to a "control" where no release agent was incorporated with the polyurethane-forming components and Example 1 refers to an example where 1% of lecithin I was incorporated. In addition, materials commercially offered as internal mold release agents were examined at the 1% level for comparison purposes. It can be seen from Table I that there was a significant reduction in release force due to the lecithin. However, it was visually apparent that the lecithin had interfered with the cure rate of the polyurethane. Therefore, the polyurethane containing the lecithin was not tested until 2-3 hours had elapsed, to allow the polyurethane to fully cure. In the case of the remaining formulations, they were tested immediately after curing and removing the excess polyurethane surrounding the metal substrate. The comparative release agents examined in this set of comparisons (Examples B-F) did not reveal any reduction in release forces when compared to the control (Example A).

The aluminum substrate utilized had been cleaned by the KOH bath method. All formulations were poured on the substrate before the exotherm.

TABLE I

| Comparison/Example | A | B | C | D | E | F | 1 |
|---|---|---|---|---|---|---|---|
| Polyol blend I | 41g → | | | | | | |
| MG-17 | | 0.60g | 0.60g | | | | |
| Loxiol (80%) and 7063 (20%) | | | | 0.60g | | | |
| Loxiol 7063 | | | | | 0.60g | 0.60g | |
| Lecithin I | | | | | | | 0.60g |
| Isocyanate A Prepolymer | 19.4g → | | | | | | |
| Release Forces and Travel | | | | | | | |
| Min., lbs. | 21 | 16.3 | 13 | 17.5 | 21.8 | 23.2 | 4.5 |
| Max., lbs. | 34.6 | 33 | 28.2 | 30.5 | 33 | 36.5 | 6.8 |
| Travel, in. | 3.85 | 3.7 | 3.55 | 3.7 | 4.0 | 3.8 | 3.2 |

EXAMPLES 2 – 5

To test the theory of cure inhibition by the residual acid in lecithin upon the dibutyl tin dilaurate catalyst (DBTD) in polyol blend I this set of examples increased the loading of DBTD at a constant level of lecithin I (1% based on total urethane-forming components). Similar aluminum substrates and method of cleaning were employed, as in Example 1 and Table I. In all examples and comparison, the formulations were poured before exotherm.

In Table II the release forces and travels are recorded for the formulations evaluated. Notice the travel is also decreased corresponding to lower values of release force, which is associated with the presence of lecithin in the compositions. Examples 3, 4 and 5 were fully cured after removal from the oven at 150° F. Example 2, as expected, was still tacky upon removal from the oven. It was similar to Example 1. However, this time it was allowed to cure for 3 days to assure a fully cured polyurethane. On the third day the cured polyurethane was manually removed from the aluminum with ease.

TABLE II

| Comparison/Example | G | 2 | 3 | 4 | 5 |
|---|---|---|---|---|---|
| Polyol blend I | 41g → | | | | |
| DBTD* | | | 0.026g | 0.052g | 0.078g |
| Lecithin I | | 0.60g | 0.60g | 0.60g | 0.60g |
| Isocyanate A Prepolymer | 19.4g → | | | | |
| Release Forces And Travel | | | | | |
| Min., lbs. | 28 | | 3.4 | 3.2 | 3.6 |
| Max., lbs. | 46 | | 8.7 | 9.5 | 5.4 |
| Travel, in. | 4.0 | | 2.2 | 1.8 | 2.6 |

*Additional DBTD added to polyol blend.

EXAMPLES 6 – 9

These examples used lecithin I at the 1% level (based on the total urethane-forming system) with and without the presence of additional catalyst as the neutralizer for residual acid in the lecithin. Table III depicts the release forces and travel for the formulations examined. All formulations were poured onto the substrate before exotherm.

Again, aluminum substrates cleaned by the severe treatment with KOH were utilized as in Example 1.

It is noted from Table III that, as the loading of catalyst is increased in the absence of lecithin, the release forces reach a maximum and level off. However, these release forces are greater in value than the primary "control" Comparison H. As the catalyst is increased in the presence of 1% lecithin, the release forces continue to rise in value, but are significantly lower than the corresponding "controls," i.e., Comparisons H – L.

TABLE III

| Comparison/Example | H | I | J | K | L | 6 | 7 | 8 | 9 |
|---|---|---|---|---|---|---|---|---|---|
| Polyol blend I | 41g → | | | | | | | | |
| Dabco 33LV | | 0.0855g | 0.1425g | 0.1995g | 0.2565g | 0.0855g | 0.1425g | 0.1995g | 0.2565g |
| Lecithin I | | | | | | 0.60g | 0.60g | 0.60g | 0.60g |
| Isocyanate A Prepolymer | 19.4g → | | | | | | | | |
| Release Forces And Travel | | | | | | | | | |
| Min., lbs. | 26.5 | 29 | 31 | 30.5 | 30 | 3.8 | 7.2 | 9.8 | 13 |
| Max., lbs. | 37.5 | 48.4 | 57 | 56.5 | 57.3 | 8.0 | 10.7 | 17.4 | 19.1 |

TABLE III-continued

| Comparison/Example | H | I | J | K | L | 6 | 7 | 8 | 9 |
|---|---|---|---|---|---|---|---|---|---|
| Travel, in. | 4.1 | 4.0 | 4.0 | 4.0 | 4.05 | 2.55 | 3.05 | 3.25 | 3.25 |

EXAMPLES 10 – 16

These examples evaluated lecithins from several commercial sources. In all cases the substrate was cleaned in KOH bath as described hereinabove. Also, in all cases the formulations were poured on the substrate before exotherm.

From Table IV it can be seen that each of the lecithins at 1% loadings significantly reduced the release forces and travel when compared to the "controls" Comparisons M and N. In addition, the loading of lecithin was reduced to 0.5% (Example 10) without the presence of additional catalyst and in two cases (Examples 15 and 16) with the presence of additional catalyst over and above the 0.08% originally present in the starting polyol blend.

TABLE IV

| Comparison/Example | M | N | 10 | 11 | 12 | 13 | 14 | 15 | 16 |
|---|---|---|---|---|---|---|---|---|---|
| Polyol blend I | 41g → | | | | | | | | |
| DBTD* | | 0.735g | | 0.735g → | | | | 0.049g | 0.0245g |
| Lecithin I | | | 0.30g | 0.60g | | | | 0.30g | 0.30g |
| Lecithin II | | | | | 0.60g | | | | |
| Lecithin III | | | | | | 0.60g | | | |
| Lecithin IV | | | | | | | 0.60g | | |
| Isocyanate A Prepolymer | 19.4g → | | | | | | | | |
| Release Forces And Travel | | | | | | | | | |
| Min., lbs. | 30 | 31 | 6.1 | 2.9 | 2 | 3.4 | 2.5 | 6.8 | 4.6 |
| Max., lbs. | 41.5 | 42.8 | 10 | 5.9 | 5.2 | 8.2 | 5.6 | 13.9 | 12 |
| Travel, in. | 4.05 | 4.05 | 3.1 | 2.4 | 2.2 | 2.6 | 2.25 | 3.2 | 2.65 |

*Additional catalyst added to polyol blend.

TABLE V

| Comparison/Example | O | P | 17 | Q | 18 |
|---|---|---|---|---|---|
| Polyol blend I | 41g → | | | | |
| DBTD* | | 0.069g | 0.069g | | 0.069g |
| Lecithin I | | | 0.60g | | |
| Soybean Oil (once refined)** | | | | 0.60g | |
| Lecithin V | | | | | 0.60g |
| Isocyanate A Prepolymer | 19.4g → | | | | |
| Release Forces And Travel | | | | | |
| Min., lbs. | 27.7 | 29.5 | 2.6 | 22.5 | 2.1 |
| Max., lbs. | 47.7 | 45.8 | 4.9 | 35.3 | 5.3 |
| Travel, in. | 4.1 | 3.95 | 2.45 | 4.05 | 1.6 |

*Additional DBTD added to polyol blend.
**Obtained from Cargill Corporation.

EXAMPLES 17 – 18

Table V records the results obtained when a once refined soybean oil (Comparison Q) is examined in the urethane system and compared with a "control" (Comparison O) and a formulation containing Lecithins I and V. The once refined soybean oil had been processed to remove all or most of the lecithin by water and solvent treatment by the Cargill Corporation. The once refined soybean oil is normally utilized for the production of epoxidized soybean oil which is utilized more commonly as a plasticizer in PVC. Since lecithin or its epoxidized version is not a plasticizer for PVC, due to its degree of polarity, it is intentionally removed from crude soybean oil. These examples and comparisons very clearly indicate the need for lecithin to obtain significantly reduced levels of release force. The once refined soybean oil is significantly inferior to the lecithins examined. In fact, the release forces for the once refined soybean oil approaches that of the "controls," Comparisons O and P.

These examples and comparison used aluminum substrate cleaned by KOH bath as described above and all formulations were poured onto the substrate before the exotherm.

EXAMPLES 19 – 23

Since it has been established that additional catalyst is needed to overcome the cure interference resulting from the residual acid in lecithin, a preneutralization of lecithin was examined in these examples. Previously, this residual acid in lecithin was neutralized by either increasing the tin catalyst level, Examples 3 – 5, 10 – 18, or introducing Dabco 33LV into the polyol blend along with the lecithin, Examples 6 – 9.

Table VI refers to the incorporation of several preneutralized lecithins into the urethane. The following were employed to preneutralize lecithin and were added to lecithin in stoichiometric amounts based on the acid number of the lecithin:

1. Ethomeen 0/15, Armak Co. - oleic amine ethoxylated with 5 mols of ethylene oxide.
2. Ethomeen 0/25, Armak Co. - oleic amine ethoxylated with 15 mols of ethylene oxide.
3. Trymeen TAM-8, Trylon Chemicals, Inc. - Tallow amine ethoxylated with 8 mols of ethylene oxide.
4. Dabco 33LV - 33% triethylene diamine in dipropylene glycol.

It was observed that the preneutralized lecithins had indeed overcome the interference of cure rate of the polyurethane. Table VI records the significantly lower release forces measured for lecithin that has been preneutralized separately with the aforementioned amines when compared to the "control" without lecithin (Comparisons R, S and T). In addition, Ethomeen 0/15 and 0/25 were examined each at the same loading of lecithin (1%) (Comparisons S and T). It can be seen that the release forces were comparable to or higher than the "control" (Comparison R).

The aluminum panels were cleaned by KOH as described above and all formulations were poured on the panels before the exotherm.

above were utilized and all formulations were poured on the panels before the exotherm.

TABLE VIII

| Comparison/Example | V | 27 | W | 28 | X | 29 |
|---|---|---|---|---|---|---|
| Polyol blend IV | 41g | 41g | | | | |
| Polyol blend II | | | 41g | 41g | | |
| Polyol blend I | | | | | 41g | 41g |
| DBTD* | | 0.069g | | 0.069g | | 0.069g |
| Lecithin I | | 0.60g | | 0.60g | | 0.60g |
| Isocyanate A Prepolymer | | | | | | |

TABLE VI

| Comparison/Example | R | 19 | 20 | 21 | 22 | 23 | S | T |
|---|---|---|---|---|---|---|---|---|
| Polyol blend II | 41g → | | | | | | | |
| DBTD* | | 0.046g | | | | | | |
| Lecithin IV | | 0.60g | | | | | | |
| Lecithin IV, 81.6% | | | 0.74g | | | | | |
| Ethomeen 0/15, 18.4% | | | | | | | | |
| Lecithin IV, 70.2% | | | | 0.85g | | | | |
| Ethomeen 0/25, 29.8% | | | | | | | | |
| Lecithin IV, 78.1% | | | | | 0.77g | | | |
| Trymeed TAM 8, 21.9% | | | | | | | | |
| Lecithin IV, 92.8% | | | | | | 0.65g | | |
| Dabco 33LV, 7.2% | | | | | | | | |
| Ethomeen 0/15 | | | | | | | 0.60g | |
| Ethomeen 0/25 | | | | | | | | 0.60g |
| Isocyanate A Prepolymer | 19.4g → | | | | | | | |
| Release Forces And Travel | | | | | | | | |
| Min., lbs. | 19.4 | 2.8 | 2.6 | 3.5 | 2.8 | 3.8 | 24.5 | 32 |
| Max., lbs. | 35.5 | 4.8 | 5.4 | 5.7 | 4.5 | 6.8 | 41 | 45.8 |
| Travel, in. | 3.9 | 1.7 | 1.8 | 2.6 | 1.9 | 2.25 | 3.9 | 3.95 |

*Additional DBTD added to polyol blend.

EXAMPLES 24 – 26

Most of the experiments employed the polyol blend I which had a hydroxyl number of 181. The object of these examples was to determine whether lecithin performed similarly as an internal release agent in a polyurethane employing a different polyol blend having an hydroxyl number of 153. From Table VII it can be seen that lecithin was indeed effective in decreasing the release forces necessary to remove the cured polyurethane from aluminum panels cleaned by KOH as described above. All formulation were poured onto the panels before the exotherm.

TABLE VII

| Comparison/Example | U | 24 | 25 | 26 |
|---|---|---|---|---|
| Polyol blend III | 43.2g → | | | |
| DBTD* | | 0.0235g | 0.047g | 0.0705g |
| Lecithin I | | 0.15g | 0.30g | 0.60g |
| Isocyanate A Prepolymer | 17.2g → | | | |
| Release Forces And Travel | | | | |
| Min., lbs. | 14.2 | 4.7 | 3.3 | 2.3 |
| Max., lbs. | 27.7 | 9.6 | 6.3 | 5.2 |
| Travel, in. | 3.8 | 2.8 | 2.0 | 2.3 |

*Additional DBTD added to polyol blend.

EXAMPLES 27 – 29

Polyol blends containing 0.02, 0.05 and 0.08% of DBTD, respectively, were employed in order to determine whether lecithin was effective in each. A constant level of additional DBTD was employed with the lecithin to overcome cure interference. From Table VIII it is apparent that lecithin continues to respond as an efficient internal release agent for the formulations listed. Aluminum panels cleaned by KOH as described (continuing Table VIII)

| | 19.4g → | | | | | |
|---|---|---|---|---|---|---|
| Release Forces And Travel | | | | | | |
| Min., lb. | 15 | 1.2 | 29.5 | 1.4 | 22.5 | 1.1 |
| Max., lb. | 24.4 | 2.2 | 41.6 | 3.2 | 41.5 | 1.9 |
| Travel, in. | 3.9 | 0.6 | 3.95 | 1.0 | 3.85 | 0.85 |

*Additional DBTD added to polyol blend.

EXAMPLES 30 and 31

Lecithin is derived from crude soybean oil. Crude soybean oil is reported to have 3% lecithin. Therefore, the object of these examples was to determine whether crude soybean oil performed as an internal release agent in urethane. In addition, Comparison AA is included to determine the effect of a degummed soybean oil. Degummed soybean oil is extracted from crude soybean oil and is relatively lecithin free. Table IX shows the release forces measured for a cured polyurethane molded upon aluminum substrates cleaned by KOH as described above. All formulations were poured onto the substrate before the exotherm. Lecithin, crude soybean oil, and the degummed soybean oil were examined each at the 1% loading, based on the total polyurethane system. As expected, the degummed soybean oil (Comparison AA) had values similar to the control (Comparison X). Lecithin (Example 30) performed admirably again. The crude soybean oil formulation (Example 31) revealed a significant improvement in release forces compared to the control (Comparison X). It is believed that higher levels of crude soybean oil in the formulation (Example 31) would indeed produce release forces comparable to lecithin (Example 30).

TABLE IX

| Comparison/Example | Z | 30 | AA | 31 |
|---|---|---|---|---|
| Polyol blend I | 41g ────────────────────────→ | | | |
| DBTD* | | 0.075g | | |
| Lecithin I | | 0.60g | | |
| Degummed Soybean Oil** | | | 0.60g | |
| Crude Soybean Oil** | | | | 0.60g |
| Isocyanate A Prepolymer | 19.4g ────────────────────────→ | | | |
| Release Forces And Travel | | | | |
| Min., lbs. | 19.6 | 1.2 | 11.8 | 1.8 |
| Max., lbs. | 32 | 2.8 | 21.8 | 3.0 |
| Travel, in. | 3.7 | 0.4 | 3.4 | 3.7 |

*Additional DBTD added to polyol blend.
**Cargill Corp.

EXAMPLES 32 – 34

This study examined the level of lecithin at 0.25%, 0.5% and 1% in the total polyurethane system. In addition, the DBTD level was raised as the lecithin level was increased. Also, proper controls consisting of formulations with increased levels of DBTD were examined, each without the presence of lecithin.

This study differed from previous examples in that the aluminum substrates were mildly cleaned (Cleaning Method B) by washing twice with Ivory Soap suds followed by a warm water rinse, then dried with a clean cheese cloth. From Table X it is obvious that the release forces and travel for the control, Comparison BB, are significantly less than the release forces measured for the controls in Tables I, II, III and IV (Comparison A, G, H and M, respectively). The latter four controls employed aluminum substrates cleaned utilizing a KOH bath (Cleaning Method A). This indicates that Cleaning Method B is not as effective as Cleaning Method A, leaving materials on the surface that act as release agents. All formulations were poured onto the substrates before the exotherm.

Table X also points out that formulations with a high DBTD level (0.0675 g) are superior to those formulations containing both a high level of DBTD and lecithin.

Significant is the fact that as little as 0.25% of lecithin (Example 32) reduces the release forces when compared to the control (Comparison BB).

TABLE X

| Comparison/Example | BB | CC | DD | EE | 32 | 33 | 34 |
|---|---|---|---|---|---|---|---|
| Polyol blend I | 41g ────────────────────────────────────────────→ | | | | | | |
| DBTD* | | 0.0225g | 0.045g | 0.0675g | 0.0225g | 0.045g | 0.0675g |
| Lecithin I | | | | | 0.15g | 0.30g | 0.60g |
| Isocyanate A Prepolymer | 19.4g ────────────────────────────────────────────→ | | | | | | |
| Release Forces And Travel | | | | | | | |
| Min., lbs. | 2.2 | 1.5 | 0.2 | 1.5 | 1.4 | 1.0 | 0.7 |
| Max., lbs. | 7.9 | 4.4 | 2.6 | 4.8 | 3 | 2.5 | 2.1 |
| Travel, in. | 1.8 | 2.0 | 1.15 | 1.37 | 1.55 | 1.0 | 1.1 |

*Additional DBTD added to polyol blend.

EXAMPLES 35 – 37

This study also employed aluminum substrates that were cleaned by washing with Ivory Soap suds (Cleaning Method B). It is recognized that this is a milder method of cleaning compared to the KOH treatment.

Lecithin I is compared to the competitive candidates MG-17 and the blend of Loxiol and 7063, each at loadings as low as 0.25% based on the total polyurethane system. Table XI records the release forces and travel measured and indicates that lecithin is more efficient not only in reference to release forces but also travel during release of the cured polyurethane from the aluminum substrate. All formulations were poured onto the substrates before exotherm.

TABLE XI

| Comparison/Example | FF | GG | HH | II | JJ | KK | 35 | 36 | 37 |
|---|---|---|---|---|---|---|---|---|---|
| Polyol blend I | 41g ────────────────────────────────────────────────────→ | | | | | | | | |
| DBTD* | | | | | | | 0.0235g | 0.047g | 0.0705g |
| MG-17 | | 0.15g | 0.30g | 0.60g | | | | | |
| Loxiol (80%)/ 7063 (20%)** | | | | | 0.15g | 0.30g | | | |
| Lecithin I | | | | | | | 0.15g | 0.30g | 0.60g |
| Isocyanate A Prepolymer | 19.4g ────────────────────────────────────────────────────→ | | | | | | | | |
| Release Forces And Travel | | | | | | | | | |
| Min., lb. | 2.7 | 1.8 | 2.0 | 1.7 | 2.0 | 1.5 | 1.1 | 0.8 | 0.9 |
| Max., lb. | 5.1 | 4.0 | 5.0 | 2.9 | 4.6 | 4.2 | 2.5 | 2.3 | 1.8 |
| Travel, in. | 2.35 | 1.15 | 1.2 | 1.05 | 1.45 | 1.2 | 0.85 | 0.7 | 0.65 |

*Additional DBTD added to polyol blend.
**Blend recommended by Henkel, Inc.

EXAMPLE 38

The combination of Dabco 33LV and lecithin is examined here utilizing aluminum substrates cleaned with Ivory Soap. In Example 5 (Table II) this same combination was examined on aluminum panels that had been KOH cleaned. The Dabco 33LV is quite active as a neutralizer of the residual acid found in the lecithin. Table XII reveals the significant reduction in release force when lecithin and Dabco 33LV are combined. The examination of Dabco 33LV without the presence of lecithin (Comparison MM) reveals release forces comparable to the primary control (Comparison LL). controls. Lecithin again was found to have superior mold release properties.

TABLE XIII

| Comparison/Example | NN | OO | PP | QQ | RR | 39 | 40 |
|---|---|---|---|---|---|---|---|
| Polyol blend I | 41g | → | | | | | |
| DBTD* | | 0.088g | 0.132g | | | 0.088g | 0.132g |
| MG-17 | | | | 0.60g | | | |
| Loxiol (80%)/ 7063 (20%) | | | | | 0.60g | | |
| Lecithin I | | | | | | 0.60g | 0.60g |
| Isocyanate A Prepolymer | 19.4g | → | | | | | |
| Release Forces And Travel | | | | | | | |
| Min., lbs. | 11.5 | 13.3 | 10.5 | 13.3 | 7.5 | 0.2 | 0.7 |
| Max., lbs. | 26.5 | 24.2 | 21 | 23.8 | 20 | 0.7 | 3.5 |
| Travel, in. | 3.6 | 3.6 | 3.2 | 3.7 | 3.6 | 0.7 | 2.2 |

*Additional DBTD added to polyol blend.

All formulations were poured on the substrates before exotherm.

TABLE XII

| Comparison/Example | LL | MM | 38 |
|---|---|---|---|
| Polyol blend I | 41g | 41g | 41g |
| Dabco 33LV | | 0.0795g | 0.0795g |
| Lecithin I | | | 0.60g |
| Isocyanate A Prepolymer | 19.4g | 19.4g | 19.4g |
| Release Forces And Travel | | | |
| Min., lbs. | 3.9 | 5.6 | 1.6 |
| Max., lbs. | 8.9 | 8.6 | 4.0 |
| Travel, in. | 2.4 | 2.65 | 1.15 |

EXAMPLES 39 and 40

In these examples and comparisons, the metal substrate was bright nickel-plated steel obtained from the American Nickeloid Company. It had been determined previously that when the nickel-plated steel was cleaned mildly by washing with Ivory Soap, the bright finish remained water repellent. A polyurethane formulation, without the presence of any release agent, was poured upon the mildly cleaned substrates before exotherm. Although not measured on the Instron tester, the cured polyurethanes were pulled off each substrate with ease. Therefore, it was concluded that no release agent was necessary. However, when the nickel-plated steel was harshly cleaned by washing with Ajax cleanser twice, followed by tap water rinsing, the results, as shown in Table XIII, was quite different. The harshly cleaned substrates were easily wet by water and polyurethanes cured thereon could not be removed therefrom.

In Table XIII, MG-17, the blend of Loxiol and 7063 (80/20) and Lecithin I were examined. Three controls were employed. The first control (Comparison NN) utilized the polyol blend I with 0.08% DBTD, while the other two controls (Comparisons OO and PP) employed levels of DBTD comparable to formulations containing the lecithin. From Table XIII it can be seen that the release forces for all the controls were significantly higher than the formulations containing the lecithin (Examples 39 and 40). In fact, the competitive release agents (Comparisons QQ and RR) had virtually no effect on the release forces when compared to the controls.

Employing nickel-plated steel cleaned with Ajax cleanser as above, the competitive release agents MG-17 and the blend of Loxiol and 7063 were utilized separately. However, the pouring of the mixed urethane-forming components was delayed until the exotherm could be felt. Previous experience had indicated that the release forces could be decreased by pouring during the exotherm rather than before, although this presented some danger. During the exotherm, and while continuing to mix the urethane components, the viscosity of the formulation, with or without the release agents, increases. Therefore, a relatively viscous formulation is then poured. In addition, it is difficult to control this set of conditions so that the same viscosity or temperature of exotherm is reached each time. In other words, the disadvantages of pouring under the above conditions are numerous. Whereas with lecithin as a release agent, pouring can be accomplished prior to the exotherm and viscosity increased as described in Table XIII while obtaining low release forces.

From Table XIV it can be seen that a reduction in release forces was realized for the competitive products (Comparisons TT and UU), but those values are significantly inferior to the release forces measured for lecithin (Examples 39 and 40) using the same substrate and recorded in Table XIII. The formulations containing the competitive products were poured during the exotherm while the formulations containing lecithin were poured before the exotherm which is more desirable.

TABLE XIV

| Comparison | SS | TT | UU |
|---|---|---|---|
| Polyol blend I | 41g | 41g | 41g |
| MG-17 | | 0.60g | |
| Loxiol (80%)/ 7063 (20%) | | | 0.60g |
| Isocyanate A Prepolymer | 19.4g | 19.4g | 19.4g |
| Release Forces And Travel | | | |
| Min., lbs. | 9.5 | 4.5 | 2.6 |
| Max., lbs. | 18.4 | 11.9 | 7.5 |
| Travel, in. | 3.75 | 2.25 | 2.3 |

EXAMPLES 41 – 43

Table XV records the formulations that were cured into solid urethanes and the surface of each spray painted first with Durethane 600 gray primer followed by the recommended bake cycle and then Durethane 200 blue top coat followed by the recommended bake cycle. Durethane 600 and 200 are urethane paints obtained from PPG Industries and were applied according to their recommendations. The formulations in Table XV consisted of the control (Comparison VV) and three other formulations containing 0.25%, 0.5% and 1% of lecithin (Examples 41, 42 and 43, respectively). The cured polyurethanes were not degreased or etched prior to painting.

The painted polyurethanes were tested for paint adhesion at room temperature by applying the standard X cut through the painted surface with a razor blade followed by the Scotch brand tape peel test familiar to paint manufacturers. In all cases the paint adhesion to each urethane surface was excellent.

TABLE XV

| Comparison/Example | VV | 41 | 42 | 43 |
|---|---|---|---|---|
| Polyol blend I | 41g | ———————————————> | | |
| DBTD* | | 0.023g | 0.046g | 0.069g |
| Lecithin IV | | 0.15g | 0.30g | 0.60g |
| Isocyanate A Prepolymer | 19.4g | ———————————————> | | |
| Paint Adhesion | excellent | excellent | excellent | excellent |

*Additional DBTD added to polyol blend.

EXAMPLE 44

A urethane enamel (PPG 100) was applied to a cured polyurethane containing 1% lecithin, e.g., as prepared in Examples 39 and 40. After drying of the enamel, the standard razor X was cut in the enamel followed by the Scotch brand tape peel test, familiar to paint manufacturers, and revealed excellent adhesion of the enamel to the polyurethane surface.

The painted urethane, after being scratched with an X, was soaked in water at room temperature for 60 hours, and the Scotch brand tape test was repeated. No loss of adhesion was noted.

EXAMPLE 45

It is desirable to have an internal release agent that is compatible with one or more of the components of the liquid urethane-forming system. This relates to the shipment of urethane-forming components containing a release agent without the fear of the release agent settling out. Therefore, compatibility tests were conducted where lecithin was incorporated into Polyol B at a concentration of 1.8%. This level of lecithin in the polyol blend was selected because the polyol blend is combined with an isocyanate prepolymer to form the cured polyurethane, thus diluting the lecithin in the total urethane-forming system to the desirable level of approximately 1%. After one week of observation the polyol blend/lecithin mixture was still clear indicating no incompatibility problems.

EXAMPLES 46 – 48

Rigid Foam

Rigid polyurethane foams having the formulation given in Table XVI with and without lecithin were molded in an L-shaped mold. In each case, in the bottom of the mold was placed a 3 inches × 5 inches × 0.025 inch aluminum panel that was cleaned by washing in Ivory Soap suds. After the rigid polyurethane had cured, it was removed from the mold with the aluminum panel attached to the bottom of the L-shaped polyurethane. The ease of removal of the aluminum panels from the foams containing lecithin was superior to that of the control as evidenced by the clean panels removed from the former as compared to the panel removed from the control which panel still had rigid polyurethane foam adhered to it after removal from the molded form.

Table XVI

Rigid Polyurethane Foam Formulation

| | Wt. Pts. |
|---|---|
| Polyol polymer V | 100.0 |
| Tris(chloroethyl) phosphate flame retardant | 5.0 |
| L-5420 silicone surfactant | 1.0 |
| Dimethylethanol amine | 1.0 |
| Trichlorofluoromethane | 30.0 |
| Isocyanate B | 112.00 |

The Polyol Polymer V employed herein was obtained by reacting phenol, aniline and formaldehyde in equimolar amounts to provide the reaction product (PAF) which was then mixed in an amount of 64 wt. pts. PAF with 36 wt. pts. dipropylene glycol. The resulting mixture was reacted with ethylene oxide and propylene oxide in a ratio of 12 wt. % ethylene oxide and 88% propylene oxide to provide a polyol polymer having 52 wt. % mixed alkylene oxides, 30.7 wt. % PAF and 17.3 wt. % dipropylene glycol reacted therein and having a functionality of 3.4, a hydroxyl number of 375 and a calculated MW of 509.

The L-5420 silicone surfactant was the reaction product of a silicone polymer having $\equiv$ SiH groups and an allyl polyether.

The Isocyanate B reactant was the reaction product of aniline and formaldehyde phosgenated to form an isocyanate having a free NCO of 28%.

The lecithin incorporated into the urethane-forming compositions are as follows:

| Example | Grade | Loading |
|---|---|---|
| | | p/100 total polyurethane |
| 46 | Lecithin II | 5 |
| 47 | Lecithin III | 5 |
| 48 | Preneutralized lecithin containing 81.6 wt. % Lecithin IV and 18.4 wt. % Ethomeen 0/15 identified hereinabove. | 6.1 |

COMPARISONS WW

The following is a partial list of silicone and nonsilicone materials that were examined as internal release agents in the polyol blend I, isocyanate A prepolymer polyurethanes at loadings from 1 – 3%. Release forces were measured and in each case were comparable to or greater than the control without any release agent present. This will serve to point out the uniqueness of lecithin as a highly efficient internal mold release agent.

The silicones consisted of dimethyl and other organo-substituted silicones, while the organic materials were essentially waxes, hydrocarbon lubricants, liquid polyesters, fatty amines + amides, and metal soaps.

1. Dimethyl silicone oil (350 cstk)
2. Dimethyl silicone oil (500 cstk)

3. Dimethyl silicone oil (1000 cstk)
4. Octadecyl trimethoxy silane + polymeric version thereof
5. Methyl trimethoxysilane
6. Polyethylsilicate
7. Armoslip EXP, erucamide (fatty amide) - Armak, Inc.
8. AC polyethylene wax - Allied Chemical Corp.
9. DNPA 3130 polyethylene - Union Carbide Corp.
10. DFDA 0053 polyethylene - Union Carbide Corp.
11. Airwax C, synthetic hydrocarbon wax - Hoescht, Inc.
12. Hoescht Wax DP, synthetic hydrocarbon wax - Hoescht, Inc.
13. Stearone - Argus Chem. Co.
14. Aluminum stearate
15. Magnesium stearate
16. Calcium stearate
17. Barium stearate
18. Atreol 6, mineral oil - Atlantic Richfield Corp.
19. Atreol 9, mineral oil - Atlantic Richfield Corp.
20. Atreol 34, mineral oil - Atlantic Richfield Corp.
21. HTSA 3, stearyl erucamide - Lonza, Inc.
22. Loxiol G-30, mono fatty acid esters of fatty alcohols - Henkel, Inc.
23. Loxiol G-71, complex ester of unsaturated fatty esters - Henkel, Inc.
24. Loxiol G-10, monoglycerol ester of unsaturated fatty acid - Henkel, Inc.
25. Loxiol G-16, diglycerol ester of unsaturated fatty acid - Henkel, Inc.
26. Loxiol G-40, mono fatty acid esters of fatty alcohols - Henkel, Inc.
27. Cereclor S-52, chlorinated mineral oil - ICI, Inc.
28. Kerosine, odorless - Fisher Scientific
29. Emolein 2900 A, esters of polymerized $C_{18}$ fatty acid - Emery Ind.
30. Emolein 2905B, esters of polymerized $C_{18}$ fatty acid - Emery Ind.
31. Emolein 2901A, esters of polymerized $C_{18}$ fatty acid - Emery Ind.
32. Emolein 2902A, esters of polymerized $C_{18}$ fatty acid - Emery Ind.
33. Emolein 2908A, esters of polymerized $C_{18}$ fatty acid - Emery Ind.
34. Liquid paraffins

EXAMPLES 49 – 66

In each of the examples and the two controls (Comparisons XX and YY), Polyol Blend V and Isocyante A Prepolymer were used in amounts providing an index of 1.05. The polyol blend V contained 0.6 wt. pts. of Dabco 33LV and 0.03 wt. ptrs. DBTD per hundred wt. pts. of the polyol blend. In each of examples 49 – 66, the release agent identified in Tables XVII and XVIII below was used in amounts given in the Tables in wt. % based on the total weight of the polyurethane. The % lecithins L-1 through L-6 were so selected as to keep the phosphatide level essentially constant in those formulations containing them. Each release agent used is described below. Each formulation was poured on the substrate identified in Tables XVII and XVIII before the exotherm. In Tables XVII and XVIII Al stands for the aluminum panels previously described and cleaned in the KOH bath. Ni designates the nickel-plated steel panels previously described and cleaned with Ajax cleanser.

| Designation | Description |
| --- | --- |
| L-1 | Actiflo 68UB, essentially phosphatidyl choline and cephalin fractions. |
| IP | Centrophil IP, essentially inositol phosphatide and cephalin fractions. |
| L-2 | Centrophil SF, essentially phosphatidyl choline and cephalin fractions where soybean oil is replaced by another vegetable oil. |
| L-3 | Centromix LP-250, essentially phosphatidyl choline and cephalin fractions in a selected carrier. |
| L-4 | Central S41KF-80, lecithin neutralized with a fatty amine. |

The above are commercially available products from Central Soya, Inc.

| | |
| --- | --- |
| L-5 | Sta-Sol UF-4, lecithin obtained from A. E. Staley, Inc. |
| ELA | DuPont ELA, an alkyl phosphate identified as being essentially a didodecyl hydrogen phosphate, $(C_{12}H_{25}O)_2HOP(O)$, having an acid number of 284. |
| L-6 | L-4 neutralized with Ethomeen 0/15. |

TABLE XVII

| Comparison/Example | XX | YY | 49 | 50 | 51 | 52 | 53 | 54 | 55 | 56 | 57 | 58 |
| --- | --- | --- | --- | --- | --- | --- | --- | --- | --- | --- | --- | --- |
| Metal substrate | Al | Ni | Al | Al | Ni | Al | Ni | Al | Ni | Al | Al | Ni |
| Release Agent | | | L-1 | IP | IP | L-2 | L-2 | L-5 | L-5 | ELA | ELA* | ELA* |
| Concentration of Release Agent | | | 1% | 1% | 1% | 1.7% | 1.7% | 1% | 1% | 1% | 1% | 1% |
| Release Forces And Travel | | | | | | | | | | | | |
| Max., lbs. | 12.3 | 11.9 | 2.9 | 2.1 | 0.0 | 0.2 | 0.0 | 0.0 | 0.0 | 0.2 | 0.3 | 0.0 |
| Min., lbs. | 5.1 | 7.9 | 1.6 | 1.0 | 0.0 | 0.07 | 0.0 | 0.0 | 0.0 | 0.2 | 0.2 | 0.0 |
| Travel, in. | 2.5 | 2.3 | 0.2 | 0.4 | 0.0 | 0.07 | 0.0 | 0.0 | 0.0 | 0.2 | 0.2 | 0.0 |
| No. of tests averaged | 3 | 1 | 2 | 3 | 1 | 3 | 1 | 2 | 1 | 1 | 3 | 1 |

*0.432 pts. (72%) additional Dabco 33LV added to polyol blend V per hundred wt. pts. thereof.

TABLE XVIII

| Comparison/Example | 59 | 60 | 61 | 62 | 63 | 64 | 65 | 66 |
| --- | --- | --- | --- | --- | --- | --- | --- | --- |
| Metal Substrate | Al | Ni | Al | Ni | Al | Ni | Al | Ni |
| Release Agent | L-3 | L-3 | L-4 | L-4 | L-6 | L-6 | L-6 | L-6 |
| Concentration of | | | | | | | | |

TABLE XVIII-continued

| Release Agent | 1.3% | 1.3% | 1% | 1% | 1.9% | 1.9% | 1.2% | 1.2% |
|---|---|---|---|---|---|---|---|---|
| Release Forces And Travel | | | | | | | | |
| Max., lbs. | 0.0 | 0.0 | 0.1 | 0.0 | 0.4 | 0.0 | 0.1 | 0.0 |
| Min., lbs. | 0.0 | 0.0 | 0.03 | 0.0 | 0.1 | 0.0 | 0.0 | 0.0 |
| Travel, in. | 0.0 | 0.0 | 0.1 | 0.0 | 0.3 | 0.0 | 0.1 | 0.0 |
| No. of tests averaged | 2 | 1 | 3 | 1 | 3 | 1 | 3 | 1 |

EXAMPLES 67 and 68

The phosphates identified below were tested in urethane-forming components in the amount of 1 wt. % of each based on the total weight of the urethane-forming components. The types and amounts of the urethane-forming components were the same as those used in Examples 49 – 66 and Comparisons XX and YY. Aluminum substrates as described hereinbefore washed with the KOH bath were employed and all formulations were poured before the exotherm.

| Designation | Description | Formula |
|---|---|---|
| P-1 | Tris(2,3-dichloropropyl)phosphate | $(ClCH_2ClCHCH_2O)_3P(O)$ |
| P-2 | Tris(2,3-dibromopropyl)phosphate | $(BrCH_2BrCHCH_2O)_3P(O)$ |
| P-3 | Tris(isopropylphenyl)phosphate | $(C_3H_7C_6H_4O)_3P(O)$ |
| P-4 | Isodecyl diphenyl phosphate | $(C_{10}H_{21}O)(C_6H_5O)_2P(O)$ |
| P-5 | Tris(2-ethylhexyl)phosphate | $(C_8H_{17}O)_3P(O)$ |
| P-6 | Tricresyl phosphate | $(CH_3C_6H_4O)_3P(O)$ |
| P-7 | Cresyl diphenyl phosphate | $(CH_3C_6H_4O)(C_6H_5O)_2P(O)$ |
| P-8 | 2-ethylhexyl diphenyl phosphate | $(C_8H_{17}O)(C_6H_5O)_2P(O)$ |
| 99 | A clear, colorless thermal polycondensation product of tris(2-chloroethyl)phosphate obtained pursuant to British Patent 1,289,711 made and sold by Stauffer Chemical Company as Fyrol 99. | |

Table XIX shows that those phosphates containing less than 8 carbon atoms in any ester substituent (RO—) bonded to phosphorus are significantly less efficient in providing mold release properties than those containing 8 or more carbon atoms in each ester (RO—) substituent and in some cases (specifically BBB and CCC), compositions containing them have worse release properties than the same composition (control ZZ) containing no additive.

TABLE XIX

| | ZZ | AAA | BBB | CCC | 67 | DDD | 68 | EEE | FFF | GGG |
|---|---|---|---|---|---|---|---|---|---|---|
| Phosphate type | | P-1 | P-2 | 99 | P-3 | P-4 | P-5 | P-6 | P-7 | P-8 |
| Release Forces And Travel | | | | | | | | | | |
| Max., lbs. | 21.7 | 20.8 | 29.0 | 35.5 | 11.6 | 25.0 | 15.4 | 18.0 | 16.9 | 19.9 |
| Min., lbs. | 17.0 | 15.3 | 18.5 | 24.0 | 5.8 | 18.4 | 8.4 | 10.0 | 7.1 | 12.6 |
| Travel, in. | 3.5 | 3.5 | 3.7 | 3.8 | 2.8 | 3.7 | 3.1 | 3.6 | 3.6 | 3.5 |

EXAMPLES 69 – 71

The polyurethanes were made from two streams:

Polyol Stream

| Butanediol-1,4 | 22 parts |
|---|---|
| Polyol B | 78 parts |
| DBTD | (see Table XX) |
| Lecithin I, if any | 1.5 parts |

Isocyanate Stream

A commercial prepolymer of a low molecular weight polyalkylene glycol and diphenylmethane diisocyanate-4,4' with a free NCO level of 23% (Mondur M-323 obtained from Mobay Chemical Company).

The polyol stream contained the tin catalyst at the level needed to give adequate hardness 2 minutes after molding; this level was increased when the lecithin was used. The lecithin tested was Lecithin I at 1.5 php (parts per hundred parts of polyol blend by weight). The two streams were metered in a laboratory mixing head so as to deliver a mixture of these streams in the ratio 100 g of polyol blend/104 g isocyanate, giving an isocyanate index of 105% of theory.

To evaluate the mold release properties of the resulting polymer, the mixing stream was poured onto a horizontal nickel-plated steel panel, 3 inches × 5 inches. For each evaluation a new panel was used, freshly cleaned with Ajax cleanser and water, dried, and warmed in a 58° C. oven for ten minutes. The resulting polymer was checked for hardness at 2 minutes after pour, trimmed to the shape of the panel, and peeled from the panel about 3½ minutes after pour. The peel strength is recorded in terms of pounds pull, a range from the highest initial pull to the lowest pull recorded, necessary to separate the polyurethane from the panel.

The following table shows the individual evaluations made, three with no additive and three with the lecithin additive.

TABLE XX

| Comparison/ Example | Additive | Catalyst level,php | Shore A Hardness | Peel strength range, lb |
|---|---|---|---|---|
| HHH | none | .03 | 80–85 | 14.5–5.4 |
| III | none | .03 | 85–85 | 7.3–6.4 |
| JJJ | none | .03 | 85–87 | 7.3–6.4 |
| 69 | Lecithin I | .10 | 80–80 | 4.3–1.3 |
| 70 | " | .10 | 80–82 | 3.6–1.0 |
| 71 | " | .10 | 80–82 | 2.7–1.0 |

One similar evaluation (not shown) with lecithin didn't gel in 200 seconds because the catalyst level was too low (i.e., 0.03 php) and hence was not tested further.

These results clearly show that a lower force is required to separate the polymer from the metal surface when lecithin was incorporated in the polyol stream.

EXAMPLE 72

This example shows the effectiveness of lecithin on repeated moldings in and releases from the same mold and compares same with the effectiveness of three other commercially available internal mold release agents MG-17 (Comparison LLL), MG-171 (Comparison MMM) (contains same active ingredient as MG-17 but with a solid calcium carbonate component removed and replaced with acetate esters) and Product 7078 (Comparison NNN) (80/20 blend of Loxiol and 7063). MG-17 and MG-171 are marketed by Axel Plastics Research Laboratories, Inc. and Product 7078 is marketed by Henkel, Inc.

The polyurethanes were made from two streams:

| Polyol Stream | |
|---|---|
| Polyol Blend II | 100 parts |
| Black Coloring (Stantone 4724) | 1.0 parts |
| Mold release agent | 1.5 parts |

Isocyanate Stream

Isocyanate A Prepolymer

The polyol stream containing lecithin contained an additional 0.15 pts. DBTD to make a total of 0.2 pts. DBTD. The two streams were metered and mixed in a Martin Sweets machine so as to deliver a mixture of the two streams in a ratio giving an isocyanate index of 105. Polyurethane elastomeric plaques were prepared on the Martin Sweets urethane mixing/metering machine using the following conditions:

| Process Conditions | |
|---|---|
| Machine | Martin Sweets (modified) |
| Mixer | Diamond Toothed |
| Mixer Speed | 5000 rpm |
| Total Thruput | 18 lb/min. |
| Polyol Temp., °F | 120 |
| Isocyanate Temp. °F | 75 |
| Mold Type | Chrome Plated Steel, ¾"×12"×12" |
| Mold Temp., °F | 150 |

Plaques were cast into the closed, chrome-plated steel mold (¾ inches ×12 inches ×12 inches) which had been cleaned with methylene chloride and dimethylformamide. In Comparison KKK, an external mold release, P-5-CL (a wax dissolved in a solvent obtained from Chem-Trend Corporation) was applied to the mold to make control plaques containing no internal mold release. All plaques were demolded in 5 minutes. Each internal mold release was evaluated for ease of demold and the number of repeated releases provided before mold cleaning was necessary. Representative plaques were analyzed for physical properties (non-oven aged).

Table XXI describes the formulations, physical properties, and processing information for the various internal mold release compounds evaluated and for the control (Comparison KKK). None of the internal mold release compounds seemed to have any significant effect on elastomer physical properties. The consistently low modulus and tensile strength results are probably caused by the plaques not being oven aged. Extra DBTD catalyst was needed (quadruple the normal amount) for processing the formulation containing Lecithin I because of its high acidity imparted by Lecithin I. This acidity comprises both fatty acid and phosphatide activity. The acidity can be preneutralized with a tertiary amine, such as triethylamine, and thus reduce the amount of extra catalyst needed in the formulation.

All of the internal mold release compounds appear to cause some density reduction, as evidenced by free-blow densities and core densities of the molded plaques. The internal mold release compounds are surface active and may act to trap gases in the urethane mix that would otherwise escape. If necessary, this may be overcome with a silicone defoamer.

Of the internal mold releases, Lecithin I (Example 72) provided the easiest release and gave 15 repeated releases from the same mold surface without cleaning or otherwise treating the mold surface. The number of repeated releases would have been higher but the run was discontinued at this point. Lecithin I neutralized (partially) with triethylamine still provided effective release action after at least 10 repeated releases. MG-17 and MG-171 were about equivalent to each other in release effectiveness. Neither released as easily as Lecithin I and each provided only 6 or 7 repeated releases before the mold surface needed cleaning. Product 7078 provided the poorest release action and gave about only 4 repeated releases before the mold surface needed cleaning.

Inital application of an external mold release, such as P-5-CL, made the first couple of demolds easier but did not increase the number of repeated releases. The difficulties with the external mold release agents are that they are effective for only one or a very few moldings and must be reapplied frequently, they build up irregularly on mold surfaces and require periodic removal and they contaminate the surface of the molded article, thus interfering with subsequent coating or painting operations. The use of lecithin as an internal mold release agent does not present these difficulties.

TABLE XXI

| Comparison/Example | KKK | 72 | LLL | MMM | NNN |
|---|---|---|---|---|---|
| Formulations | | | | | |
| Polyol Blend II | 100 | 100 | 100 | 100 | 100 |
| DBTD* | | .15 | | | |
| Isocyanate A Prepolymer | 105I | →  | | | |
| Lecithin I | | 1.5 | | | |
| MG-17 | | | 1.5 | | |
| MG-171 | | | | 1.5 | |
| Product 7078 | | | | | 1.5 |
| Physical Properties** | | | | | |
| (skin from ¾" plaques) | | | | | |
| Hardness, Shore D | 55 | 57 | 60 | 59 | 55 |
| Dart Impact (break), °F | −45 | −40 | −45 | −45 | −45 |
| Tensile Strength, psi | 2890 | 2365 | 2540 | 1835 | 2360 |
| Elongation, % | 120 | 140 | 120 | 120 | 110 |

TABLE XXI-continued

| Comparison/Example | KKK | 72 | LLL | MMM | NNN |
|---|---|---|---|---|---|
| "C" Tear, pli | 340 | 325 | 320 | 315 | 340 |
| Flex. Modulus, psi | | | | | |
| −20° F | 68,221 | 65,230 | 58,274 | 57,735 | 59,875 |
| 72° F | 13,762 | 18,480 | 13,614 | 13,600 | 13,935 |
| 150° F | 2438 | 2160 | 2615 | 2265 | 2540 |
| Core Density | 67 | 60 | 67 | 60 | 58 |
| Process Information | | | | | |
| Cream Time, sec. | 15 | 15 | 13 | 15 | 15 |
| Gel Time, sec. | 30 | 30 | 25 | 30 | 35 |
| Free-blow Density, pcf | 66 | 57 | 57 | 54 | 43 |
| Polyol stream/Isocyanate stream weight ratio | 2.2 | →  | | | |

*Additional DBTD added to Polyol Blend II to make total of 0.2 pts. DBTD.
**Physical properties were obtained on non-oven aged plaques.

"Stream weight ratio" referred to in Table XXI is calculated as follows:

Three values are required for calculation of the stream weight ratio of polyol to isocyanate: the free isocyanate content of the isocyanate and the hydroxyl number and moisture content of the polyol. They can be determined by standard analytical methods. Sample calculations follow:

Given:
Isocyanate Stream FNCO = 26.0%
Polyol Stream OH No. = 142
Polyol Stream H$_2$O Content = 0.090%

Moisture reacts with the isocyanate and is not accounted for by the OH No. of the polyol. The OH No. must be corrected by adding the OH No. equivalent of the water to the OH No.

$$0.090 \times 62.3 = 5.6 \quad 142 + 5.6 = 148 \text{ (corrected OH No.)}$$

The equivalent weight (EW) of the polyol and of the isocyanate is then calculated. Percent FNCO is based upon EW 42 (NCO) and OH No. is based upon EW 56.1 (KOH).

$$EW \text{ Isocyanate} = \frac{4.2 \times 1000}{26} = 162$$

$$EW \text{ Polyol} = \frac{56.1 \times 1000}{148} = 380$$

Since one equivalent of isocyanate plus one equivalent of polyol are required to make a urethane polymer of FNCO/OH equivalent ratio of 1.00 (or 100 index) then weight ratio of polyol to isocyanate = 380/162 = 2.34.

If an index other than 100 is desired, the formula is $$R_i = \frac{R \times 100}{\text{Index}}$$

Where R = the weight ratio for 100 index And $R_i$ = the weight ratio for any index other than 100

For example, the calculation for a 103 index is:

$$R_i = \frac{2.34}{103} \, 100 = 2.27$$

or 2.27 parts of the polyol should be reacted with 1.00 part of the isocyanate to provide a urethane polymer of 103 isocyanate index.

"Cream Time" mentioned in Table XXI is te interval of time from the formation of the complete formulation to the appearance of a creamy color in the formulation. The cream time is proportional to the rate of reaction of the formulation. "Gel Time" is the time elapsed between pouring the formulation and setting of the polyurethane as determined by probing.

"Free-blow Density" is the density of the foam produced by pouring and curing the formulation in an open mold.

The designation pcf means pounds per cubic foot and pli means pounds per linear inch.

The following ASTM methods were used in determining the physical properties given in Table XXI:

| Property | ASTM Method |
|---|---|
| Shore D hardness | D-2240 |
| Tensile strength | D-412 |
| Elongation | D-412 |
| C Tear | D-624 |
| Flex modulus | D-790 Method B |
| Core density | D-2406 |

Dart impact is the temperature at which a 3"×6"×λ ¾" plaque bent into a U-shaped is broken when impacted by a falling, round-headed dart.

What is claimed is:

1. In a composition consisting essentially of an organic polyisocyanate and an organic polyether having at least two active hydrogen atoms reactive with said polyisocyanate, that improvement imparting to said composition the property of self-release from the walls of a mold cavity comprising an organophosphorus compound selected from the class consisting of compounds of the formulas:

$$(RO)_n R'_{3-n} P(O)$$

and $$(RO)_n R'_{3-n} P$$

wherein R is a monovalent hydrocarbon group of at least 8 carbon atoms, R' is selected from the class consisting of hydrogen, hydroxyl and monovalent hydrocarbon groups, and n is an integer of 1 to 3, mixed in said composition in an amount effective to impart said self-release property.

2. In an organic composition reactive with an organic polyisocyanate in a mold to form a molded polyurethane plastic, said composition consisting essentially of an organic polyether having at least two active hydrogen atoms reactive with said polyisocyanate, that improvement imparting the property of self-release from the cavity walls of said mold comprising an organophosphorus compound selected from the class consisting of compounds of the formulas:

$$(RO)_nR'_{3-n}P(O)$$

and $$(RO)_nR'_{3-n}P$$

wherein R is a monovalent hydrocarbon group of at least 8 carbon atoms, R' is selected from the class consisting of hydrogen, hydroxyl and monovalent hydrocarbon groups, and n is an integer of 1 to 3, mixed with said composition in an amount effective to impart said self-release property.

3. A composition as claimed in claim 2 wherein the organophosphorus compound is phosphatidyl inositol.

4. A composition as claimed in claim 2 wherein the organophosphorus compound is dilaurylhydrogenphosphate.

5. A composition as claimed in claim 2 wherein the organophosphorus compound is trilaurylphosphate.

6. An organic composition reactive with an organic polyisocyanate in a mold to form a molded polyurethane plastic elastomer wherein said composition consists essentially of a mixture of:
   a. a polymer polyol comprising a major amount of a normally liquid polyoxyalkylene polyol that has a molecular weight of at least 1,500 and a hyroxyl number from 20 to 120 and that contains therein a minor amount of a film-forming organic polymer having a molecular weight of at least 5,000,
   b. an aromatic polyamine having at least two primary amine groups attached to carbon atoms of the same or different aromatic rings, at least one of such carbon atoms being adjacent to a carbon atom having a substituent other than hydrogen,
   c. an aromatic glycol, said composition containing from 97 to 65 parts by weight of (a) and from 3 to 35 parts by weight of (b) per 100 parts by weight of (a) and (b) and said composition containing from 1 to 35 parts by weight of (c) per 100 parts by weight of (a) and (c), with the proviso that the composition contains no more than 35 parts by weight of (b) and (c) per 100 parts by weight of (a), (b) and (c) and
   d. an organophosphorus compound selected from the class consisting of phosphatides and compounds of the formulas:

$$(RO)_nR'_{3-n}P(O)$$

and $$(RO)_nR'_{3-n}P$$

wherein R is monovalent hydrocarbon group of at least 8 carbon atoms, R' is selected from the class consisting of hydrogen, hydroxyl and monovalent hydrocarbon groups, and n is an integer of 1 to 3, mixed in said composition in an amount effective to impart self-release properties to said elastomer.

7. A mixture as claimed in claim 6 wherein (a) is a polymer polyol comprising a liquid polyoxypropylene triol that has terminal —OC$_2$H$_4$OH groups, that has a molecular weight from 2,000 to 8,400, that has a hydroxyl number from 25 to 150 and that contains therein a film-forming acrylonitile polymer having a molecular weight of at least 5,000, said polymer polyol containing 85 to 60 parts by weight of the polyol and from 15 to 40 parts by weight of the polymer per 100 parts by weight of the polymer polyol; (b) is 4,4'-methylene bis(2-chloroaniline); and (c) is the reaction product of an alkylene oxide and primary aromatic amine, said mixture containing from 97 to 85 parts by weight of (a) and from 3 to 15 parts by weight of (b) per 100 parts by weight of (a) and (b) and from 1 to 20 parts by weight of (c) per 100 parts by weight of (a) and (c), with the proviso that the mixture contains no more than 35 parts by weight of (b) and (c) per 100 parts by weight of (a), (b) and (c).

8. A composition as claimed in claim 6 containing a catalytic amount of catalyst for reacting the active hydrogen compounds with said organic polyisocyanate to produce an elastomer.

9. A composition as claimed in claim 6 containing a blowing agent in an amount sufficient to produce a cellular structure upon reaction of the active hydrogen compounds with said organic polyisocyanate to produce an elastomer.

10. A composition as claimed in claim 6 wherein said organophosphorus compound is lecithin.

11. A composition as claimed in claim 6 wherein said organophosphorus compound is phosphatidyl inositol.

12. A composition as claimed in claim 6 wherein said organophosphorus compound is dilaurylhydrogenphosphate.

13. A composition as claimed in claim 6 wherein said organophosphorus compound is trilaurylphosphate.

14. A method for molding polyurethane plastics in a mold cavity having metal walls comprising inserting into the mold cavity a polyurethane reaction mixture containing an organophosphorus compound selected from the class consisting of compounds of the formulas:

$$(RO)_nR'_{3-n}P(O)$$

and $$(RO)_nR'_{3-n}P$$

wherein R is a monovalent hydrocarbon group of at least 8 carbon atoms, R' is selected from the class consisting of hydrogen, hydroxyl and monovalent hydrocarbon groups, and n is an integer of 1 to 3, in an amount effective to impart to said mixture the property of self-release from the walls of said cavity, allowing the reaction mixture to react and releasing the resulting polyurethane from said mold.

15. A method for producing a cellular polyurethane-polyurea elastomer which comprises forming in a mold cavity having metal walls and curing a reaction mixture containing:
   a. a polymer polyol comprising a major amount of liquid polyoxyalkylene polyol that has a molecular weight of at least 1,500 and a hydroxyl number from 20 to 120 and that contains therein a minor amount of a film-forming organic polymer having a molecular weight of at least 5,000,
   b. an aromatic polyamine having at least two primary amine groups attached to carbon atoms of the same or different aromatic rings, at least one of such carbon atoms being adjacent to a carbon atom having a substituent other than hydrogen,
   c. an aromatic glycol,
   d. an organic polyisocyanate in an amount that provides from 0.8 to 1.3 isocyanato groups per active-hydrogen group in the reaction mixure, e. a catalytic amount of catalyst for the curing of the reaction mixture to produce the elastomer, and
f. a blowing agent in an amount sufficient to produce a cellular structure in the elastomer,
g. an organophosphorus compound selected from the class consisting of phosphatides and compounds of the forumlas:

$$(RO)_n R'_{3-n} P(O)$$

and $$(RO)_n R'_{3-n} P$$

wherein R is a monovalent hydrocarbon group of at least 8 carbon atoms, R' is selected from the class consisting of hydrogen, hydroxyl and monovalent hydrocarbon groups, and $n$ is an integer of 1 to 3, said reaction mixture containing from 97 to 65 parts by weight of (a) and from 3 to 35 parts by weight of (b) per 100 parts by weight of (a) and (b) and said reaction mixture containing from 1 to 35 parts by weight of (c) per 100 parts by weight of (a) and (c), with the proviso that the reaction mixture contains no more than 35 parts by weight of (b) and (c) per 100 parts by weight of (a), (b) and (c) and said reaction mixture containing (g) in an amount effective to impart to said elastomer the property of self-release from the walls of said mold cavity.

16. Methods as claimed in claim 15 wherein said organophosphorus compound is lecithin and it is present in an amount of 0.25 to 10% by weight based on the total weight of (a) through (g).

17. Method as claimed in claim 15 wherein said organophosphorus compound is phosphatidyl inositol present in an amount of 0.25 to 10% by weight based on the total weight of (a) through (g).

18. An elastomer produced by the process of claim 15.

19. In a method for producing a molded polyurethane plastic wherein a stream containing an organic polyisocyanate and a stream containing an organic polyether having at least two active. hydrogen atoms reactive with said polyisocyanate are impinged against one another to intimately mix same and then are introduced into a mold cavity having metal walls where the resulting mixture is cured to form said molded polyurethane, that improvement providing to said molded polyurethane the property of self-release from the cavity walls of said mold comprising mixing with one of said streams an organophosphorus compound selected from the class consisting of phosphatides and compounds of the formulas:

$$(RO)_n R'_{3-n} P(O)$$

and $$(RO)_n R'_{3-n} P$$

wherein R is a monovalent hydrocarbon group of at least 8 carbon atoms, R' is selected from the class consisting of hydrogen, hydroxyl and monovalent hydrocarbon groups, and $n$ is an integer of 1 to 3 in an amount effective to impact said self-release property.

20. An organic composition reactive with an organic polyisocyanate in a mold to form a molded polyurethane plastic, said composition containing:
a. an organophosphorus compound selected from the class consisting of phosphatides and compounds of the formulas:

$$(RO)_n R'_{3-n} P(O)$$

and $$(RO)_3 R'_{3-n} P$$

wherein R is a monovalent hydrocarbon group of at least 8 carbon atoms, R' is selected from the class consisting of hydrogen, hydroxyl and monovalent hydrocarbon groups, and $n$ is an interger of 1 to 3, mixed in said composition in an amount effective to impart self-release properties to said elastomer, and
b. a polymer polyol comprising a major amount of a normallly liquid polyoxyalklene polyol that has a molecular weight of at least 1,500 and a hydroxyl number from 20 to 120 and that contains therein a minor amount of a film-forming organic polymer having a molecular weight of at least 5,000.

21. A composition as claimed in claim 20 wherein the organophosphorus compound of (a) is lecithin.

* * * * *